United States Patent
Kim et al.

(10) Patent No.: US 12,003,196 B2
(45) Date of Patent: Jun. 4, 2024

(54) BUTTON TYPE ACTUATOR, BUTTON TYPE ACTUATOR FEEDBACK SYSTEM COMPRISING SAME, AND CONTROL METHOD THEREFOR

(71) Applicant: CK MATERIALS LAB CO., LTD., Seoul (KR)

(72) Inventors: Hyeong Jun Kim, Seoul (KR); Jong Hun Lee, Seoul (KR); Ki Suk Son, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 800 days.

(21) Appl. No.: 17/059,446

(22) PCT Filed: Dec. 19, 2018

(86) PCT No.: PCT/KR2018/016198
§ 371 (c)(1),
(2) Date: Nov. 29, 2020

(87) PCT Pub. No.: WO2019/231067
PCT Pub. Date: Dec. 5, 2019

(65) Prior Publication Data
US 2021/0159815 A1    May 27, 2021

(30) Foreign Application Priority Data

May 29, 2018   (KR) .................. 10-2018-0060995
Jul. 23, 2018    (KR) .................. 10-2018-0085483
Jul. 23, 2018    (KR) .................. 10-2018-0085484

(51) Int. Cl.
*H02N 2/06*   (2006.01)
*G06F 3/01*   (2006.01)
(Continued)

(52) U.S. Cl.
CPC .............. *H02N 2/06* (2013.01); *G06F 3/016* (2013.01); *G06F 3/0202* (2013.01); *G06F 3/041* (2013.01); *H02N 2/026* (2013.01)

(58) Field of Classification Search
CPC .......... H02N 2/06; H02N 2/026; G06F 3/016; G06F 3/0202; G06F 3/041; G06F 3/0416; G06F 3/046; B06B 1/045
See application file for complete search history.

(56) References Cited

U.S. PATENT DOCUMENTS 6,940,494 B2    9/2005   Hoshino et al.
9,513,704 B2   12/2016   Heubel et al.
(Continued)

FOREIGN PATENT DOCUMENTS

JP   2004070492 A    3/2004
JP   2004227157 A    8/2004
(Continued)

OTHER PUBLICATIONS

Korean First Office Action (10-2018-0085483) dated Jan. 31, 2020.
(Continued)

*Primary Examiner* — Emily P Pham
(74) *Attorney, Agent, or Firm* — NKL Law; Jae Youn Kim

(57) ABSTRACT

A button type actuator according to one embodiment may comprise: a case; a button part having at least a part which is moved with respect to the case by a user's pressure; a vibrator connected to the button part and including a magnetic body; and a coil for generating a magnetic field on the vibrator.

19 Claims, 10 Drawing Sheets

(51) Int. Cl.
*G06F 3/02* (2006.01)
*G06F 3/041* (2006.01)
*H02N 2/02* (2006.01)

(56) References Cited

U.S. PATENT DOCUMENTS

| | | | |
|---|---|---|---|
| 2003/0122779 | A1 | 7/2003 | Martin et al. |
| 2003/0184517 | A1* | 10/2003 | Senzui ................ H01H 13/807 |
| | | | 345/156 |
| 2012/0154134 | A1 | 7/2012 | Lim et al. |
| 2017/0285848 | A1* | 10/2017 | Rosenberg .......... G06F 3/04883 |
| 2019/0094967 | A1* | 3/2019 | Bisbee .................... G06F 3/016 |
| 2022/0096925 | A1* | 3/2022 | Kawaguchi ............. G06F 3/016 |

FOREIGN PATENT DOCUMENTS

| | | |
|---|---|---|
| JP | 2005352927 A | 12/2005 |
| KR | 20040062956 A | 7/2004 |
| KR | 100944111 B1 | 2/2010 |
| KR | 20100102412 A | 9/2010 |
| KR | 20110026081 A | 3/2011 |
| KR | 20120068421 A | 6/2012 |
| KR | 10-2017-0016991 A | 2/2017 |

OTHER PUBLICATIONS

Korean Final Office Action (10-2018-0085483) dated Oct. 29, 2020.
Korean First Office Action (10-2018-0085484) dated Jan. 31, 2020.
Korean Final Office Action (10-2018-0085484) dated Oct. 28, 2020.

\* cited by examiner

BUTTON TYPE ACTUATOR, BUTTON TYPE ACTUATOR FEEDBACK SYSTEM COMPRISING SAME, AND CONTROL METHOD THEREFOR

CROSS-REFERENCE TO RELATED APPLICATIONS

This application is a National Stage of International patent application PCT/KR2018/016198, filed on Dec. 19, 2108, which claims priority of foreign Korean patent application No. 10-2018-0060995, filed on May 29, 2018, Korean patent application No. 10-2018-0085483, filed on Jul. 23, 2018, and Korean patent application No. 10-2018-0085484, filed on Jul. 23, 2018, the disclosures of which are incorporated by reference in their entirety.

TECHNICAL FIELD

The following description relates to a button type actuator, a button type actuator feedback system including the same, and a control method therefor.

BACKGROUND ART

A general linear resonant actuator (LRA) has a structure in which vibrations generated by a vibrator are applied to a spring that is an elastic body connected to the vibrator and the spring is connected to an outer case, so that the vibrations may be transmitted to the outer case through the spring and may be thus provided to a user.

The general LRA has a limitation in that the general LRA merely functions as an output device for transmitting a generated vibration force to the user, and may not function as an input device.

The above-described background art, which was possessed or acquired by the inventor in a process of deriving the present invention, is not necessarily a technology known to the general public before filing of the present invention.

DISCLOSURE OF THE INVENTION

Technical Problem

An objective of an embodiment is to provide a button type actuator, a button type actuator feedback system including the same, and a control method therefor.

Technical Solution

A button type actuator according to an embodiment may include: a case; a button part of which at least a portion moves with respect to the case by being pressed by a user; a vibrator connected to the button part and including a magnetic body; and a coil configured to form a magnetic field in the vibrator.

The button part may be formed in an elastic valve shape, and may be installed to cover at least a portion of the upper surface of the case.

The button type actuator according to the embodiment may further include an elastic support installed between the case and the vibrator and configured to support an elastic movement of the vibrator.

The vibrator may be attached to the lower surface of the button part and may be formed of a bendable flexible material, and the magnetic body may be magnetic particles uniformly contained in the vibrator.

A button type actuator feedback system according to an embodiment may include the above-described button type actuator, and a controller configured to apply, based on the magnitude or direction of an induced electromotive force formed when the button part is pressed or released by a user, a current to the coil to move the vibrator.

The controller may move the vibrator when the magnitude of the induced electromotive force formed when the button part is pressed is equal to or larger than a set voltage magnitude.

The controller may move the vibrator when the direction of the induced electromotive force is changed as the button part starts to be released from a state in which the button part is pressed.

The controller may include: an input detection unit configured to detect the induced electromotive force generated in the coil when the button part is pressed or released; and a signal control unit configured to determine, based on information on the induced electromotive force detected by the input detection unit, a time point when the vibrator starts to be moved.

The signal control unit may move the vibrator at a time point when the voltage value of the induced electromotive force changes from a positive value to a negative value or at a time point when the voltage value of the induced electromotive force changes from a negative value to a positive value.

A button type actuator feedback system according to an embodiment may include: a touch panel; a button type actuator including a case, a button part which is connected to the lower surface of the touch panel and of which at least a portion moves with respect to the case, a vibrator connected to the lower surface of the button part and including a magnetic body, and a coil configured to form a magnetic field in the vibrator; and a controller configured to, when the upper surface of the touch pan& is contacted by a user or the button part connected to the lower surface of the touch pan& is pressed, apply a current to the coil of the button type actuator connected to the lower surface of the touch panel, to move the vibrator.

The controller may apply, based on the magnitude or direction of an induced electromotive force formed when the button part is pressed, the current to the coil to move the vibrator.

The controller may apply a contact feedback signal to the button type actuator when the upper surface of the touch panel is contacted by the user, and may apply an input feedback signal different from the contact feedback signal to the coil when the button part is pressed.

The controller may output the input feedback signal with omitting the contact feedback signal when a time from a time point when the upper surface of the touch panel is contacted by the user to a time point when the button part is pressed is within a set input time.

The contact feedback signal or the input feedback signal may vibrate the button part with respect to the case so as to form an audible sound.

A plurality of the button type actuators may be formed on the lower surface of the touch panel to be spaced apart from each other, and the controller may apply different contact feedback signals or different input feedback signals to the plurality of button type actuator, respectively.

A plurality of the button type actuators may be formed on the lower surface of the touch panel to be spaced apart from each other, and when a time from a time point when a portion of the touch panel located on the upper surface of one button type actuator among portions of the touch panel is contacted to a time point when a portion of the touch panel located on the upper surface of another button type actuator directly adjacent to the one button type actuator is contacted is within a set contact time, the controller may not apply the contact feedback signal to the button type actuator located below the firstly contacted portion of the touch panel.

A method of controlling a button type actuator feedback system including a button type actuator including a case, a button part of which at least a portion moves with respect to the case by being pressed by a user, a vibrator connected to the button part and including a magnetic body, and a coil configured to form a magnetic field in the vibrator according to an embodiment may include: an input detection step of detecting an induced electromotive force formed in the coil when the button part is pressed; and an actuator drive step of moving the vibrator based on the detected induced electromotive force.

The method according to the embodiment may further include an input identification step of determining whether or not to generate an input signal for moving the vibrator based on the magnitude or direction of the induced electromotive force.

In the input identification step, when the voltage magnitude of the induced electromotive force detected in the input detection step is equal to or larger than a set voltage magnitude, an input feedback signal may be generated.

The actuator drive step may be performed at a time point when the direction of the induced electromotive force is changed.

The method according to the embodiment may further include a movement pattern generation step of generating information on a movement pattern of the vibrator based on the formation time point, the magnitude, or the duration time of the induced electromotive force.

The movement pattern generation step may include a movement pattern setting step of setting a type of the movement pattern based on the magnitude or the duration time of the induced electromotive force formed when the button part is pressed.

The movement pattern generation step may further include: a movement time setting step of determining a movement time of the vibrator based on the duration time or the voltage magnitude of the induced electromotive force formed when the button part is pressed; and a movement intensity setting step of determining a movement intensity of the vibrator based on the voltage magnitude of the induced electromotive force formed when the button part is pressed.

In the input identification step, a different input signal may be applied to the coil for each stage of the voltage magnitude of the induced electromotive force measured in the input detection step.

In the input identification step, when the voltage magnitude of the induced electromotive force is larger than a first set voltage magnitude and smaller than a second set voltage magnitude, it may be determined that the button part is contacted by the user, and a contact feedback signal may be thus applied to the button type actuator, and when it is determined that the voltage magnitude of the induced electromotive force is equal or larger than the first set voltage magnitude and the second set voltage magnitude, it may be determined that the button part is pressed by the user, and an input feedback signal may be thus applied to the button type actuator.

In the input identification step, (i) when it is determined that the button part is pressed within a set input time from a time point when the button part is contacted, the contact feedback signal may not output, and (ii) when it is determined that the button part is not pressed within the set input time from the time point when the button part is contacted, the contact feedback signal may be output.

The contact feedback signal or the input feedback signal may move the vibrator with respect to the case so as to form an audible sound.

A method of controlling a button type actuator feedback system according to an embodiment may include: a contact identification step of identifying whether or not a touch panel attached to the upper surface of a button part of a button type actuator is contacted by a user; an input identification step of identifying whether or not the button part is pressed by the user; and an input feedback signal application step of outputting an input feedback signal for moving the button part when the button type actuator located below the touch panel is pressed.

The method according to the embodiment may further include a contact feedback signal application step of applying a contact feedback signal for driving the button type actuator located below the touch panel when it is determined in the contact identification step that the touch panel is contacted.

The contact feedback signal may be different from the input feedback signal.

In the input identification step, (i) when it is determined that the button part of the button type actuator located below the touch panel is pressed within a set input time from a time point when the upper surface of the touch panel is contacted by the user, the contact feedback signal application step may be skipped and the input feedback signal application step may be performed, and (ii) when it is determined that the button part is pressed beyond the set input time from the contacted time point, the contact feedback signal application step may be performed.

In the contact feedback signal application step, when a time from a time point when a portion of the touch panel located on the upper surface of one button type actuator is contacted to a time point when the touch pan& located on the upper surface of another button type actuator directly adjacent to the one button type actuator is contacted is within a set contact time, the contact feedback signal may not be applied to the firstly contacted one button type actuator.

Advantageous Effects

According to a button type actuator feedback system having an input and an output and a method of controlling the same according to an embodiment, the role of an input device is added to an actuator as an output device that generates only vibrations, so that the input device and the output device may be integrated into one actuator device.

According to the button type actuator feedback system having an input and an output and the method of controlling the same according to the embodiment, since the present invention is designed such that various haptic feedback according to the input may be provided and a user may feel a direct tactile sense rather than a tactile sense that is given by indirectly transmitting a vibration force, more various haptic feedback may be transmitted.

MODE FOR CARRYING OUT THE INVENTION

Figure 1:
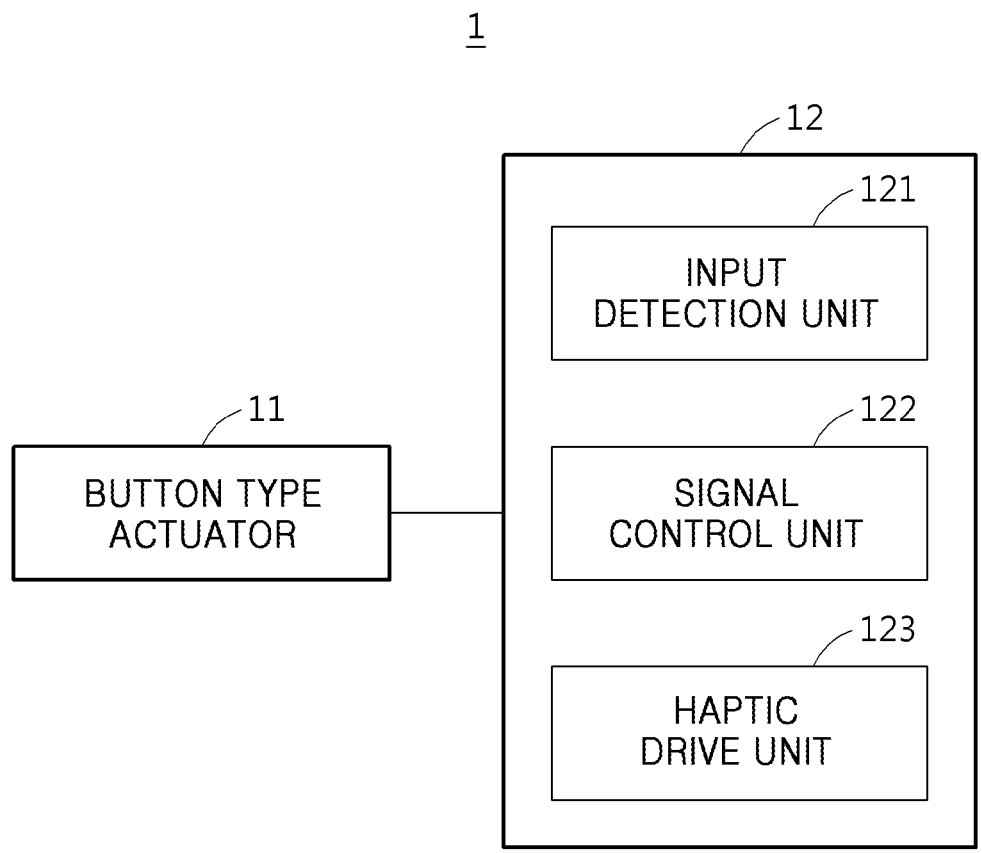
FIG. 1 is a block diagram of a button type actuator feedback system according to an embodiment.

Hereinafter, embodiments will be described in detail with reference to the exemplary drawings. It should be noted that when components in the drawings are designated by reference numerals, the same components have the same reference numerals as far as possible even though the components are illustrated in different drawings. Further, in description of the embodiments, when it is determined that detailed description of a related well-known configuration or function disturbs understanding of the embodiments, the detailed description will be omitted.

Further, in the description of the components of the embodiments, the terms such as first, second, A, B, (a) and (b) may be used. These terms are not used to delimit an essence, an order or sequence, and the like of a corresponding component but used merely to distinguish the corresponding component from other component(s). It should be understood that when one component is "connected", "coupled" or "joined" to another component, the former may be directly connected or jointed to the latter or may be "connected", "coupled" or "joined" to the latter with a third component interposed therebetween.

Components included in one embodiment and components including the common functions will be described using the same names in the other embodiments. Unless otherwise described, the description in one embodiment may be applied to the other embodiments, and detailed description will be omitted in an overlapping range.

Figure 2:
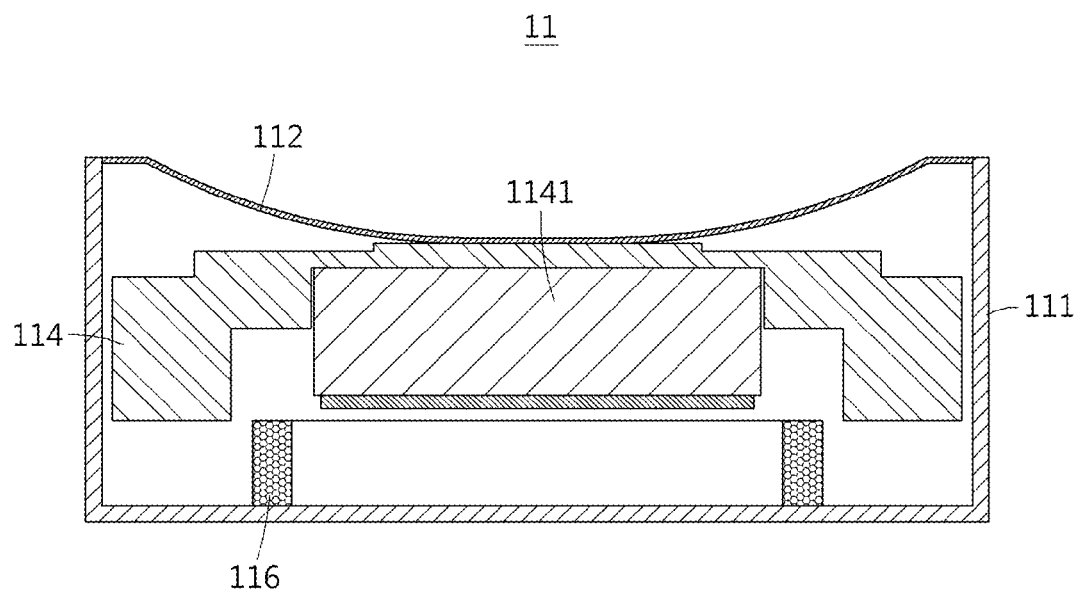
FIG. 2 is a cross-sectional view of a button type actuator according to the embodiment.
Figure 3:
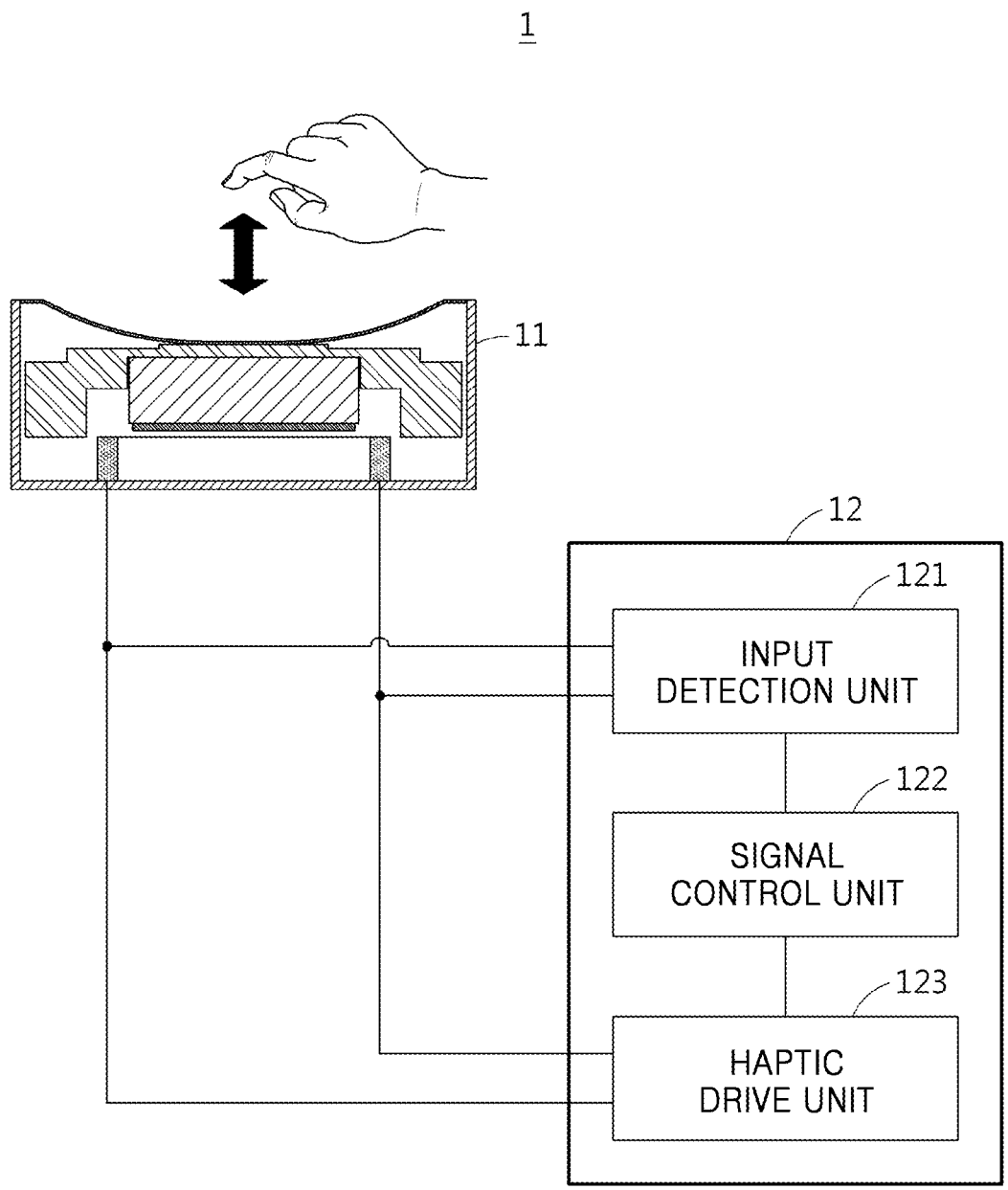
FIG. 3 is a view illustrating the button type actuator feedback system according to the embodiment.

FIG. 1 is a block diagram of a button type actuator feedback system according to an embodiment, FIG. 2 is a cross-sectional view of a button type actuator according to the embodiment, and FIG. 3 is a view illustrating the button type actuator feedback system according to the embodiment.

Referring to FIGS. 1 to 3, a button type actuator feedback system 1 according to an embodiment is a system in which a button type actuator 11, which serves as an output device that may provide haptic feedback to a user, also serves as an input device that detects a pressure from the user.

For example, the button type actuator feedback system 1 may include a button type actuator 11 and a controller 12.

The button type actuator 11 may be a linear resonant Actuator (LRA) that transmits a movement using a resonant frequency.

For example, the button type actuator 11 may include a case 111, a button part 112 (or an input part 112), a coil 116, and a vibrator 114.

The case 111 may form an outer shape of the button type actuator 11, and may have an upper surface, at least a portion of which is open.

At least a portion of the button part 112 (or the input part 112) may be installed on the upper surface of the case 111 to be movable in the vertical direction. For example, when pressed by the user, the at least a portion of the button part 112 may be moved toward an internal space of the case 111.

The button part 112 may transmit, to the user, a haptic feedback effect formed in the button type actuator 11. Further, the button part 112 may function as a contact end part for transmitting, to the controller 12, an input signal formed by being pressed by the user.

For example, the button part 112 may be formed of a flexible valve-type member installed to cover at least a portion of the upper surface of the case 111. For example, the at least a portion of the button part 112 may be elastically deformed to be downward bent when the button part 112 is pressed by the user from above, and may return to an initial position when the button part 112 is released.

The vibrator 114 may be accommodated in the internal space of the case 111 and may be connected to a lower portion of the button part 112. For example, the vibrator 114 may include a magnetic body 1141.

The magnetic body 1141 may be installed in the vibrator 114. For example, as illustrated in FIG. 2, the magnetic body 1141 may be a permanent magnet installed below the vibrator 114. However, the magnetic body 1141 may include at least one material among steel, powder, ahoy, alloy powder, a composite, and a nano structure containing magnetic element.

As another example, it should be noted that the magnetic body 1141 may be formed inside the vibrator 114 or may be formed integrally with the vibrator 114.

The coil 116 may be installed at a lower portion of the internal space of the case 111, and may receive a current from the controller 12 to form a magnetic field.

For example, the coil 116 may include a circular or polygonal planar coil or a solenoid coil. As another example, the coil 116 may be a circuit formed on a flexible printed circuit board.

According to the above structure, by adjusting frequency characteristics such as the magnitude, the direction, or the period of a voltage applied to the coil 116 from the controller 12, a magnetic field formed in the coil 116 may cause the vibrator 114 including the magnetic body 1141 to rapidly move in the vertical direction.

As a result, when a part of the user's body contacts the button part 112, the user may receive, through the button part 112 that moves relative to the case 111, the haptic feedback effect formed by the movement of the vibrator 114.

Meanwhile, when the button part 112 is pressed downward by the user so that the vibrator 114 moves with respect to the coil 116, an induced electromotive force may be generated, due to an electromagnetic induction phenomenon, along a wire connected to the coil 116.

The controller 12 may generate, by applying the current to the coil 116 of the button type actuator 11, the haptic feedback transmitted from the vibrator 114 to the button part 112.

Furthermore, the controller 12 may detect the induced electromotive force formed when the button part 112 is pressed, and may recognize the detected induced electromotive force as an input signal for driving the button type actuator 11.

For example, the controller 12 may transmit various kinds of the haptic feedback to the user by adjusting frequency characteristics such as the magnitude, the direction, or the period of a current applied to the coil 116.

For example, the controller 12 may include an input detection unit 121, a signal control unit 122, and a haptic drive unit 123.

The input detection unit 121 may detect the induced electromotive force formed when the button part 112 is pressed. For example, the input detection unit 121 may be connected to at least one side of a circuit connected between the coil 116 and the controller 12, and may receive the induced electromotive force formed in the coil 116.

For example, the input detection unit 121 may measure the magnitude and the direction of the voltage generated by the induced electromotive force formed according to the intensity by which the button part 112 is pressed and the time during which the button part 112 is pressed.

The signal control unit 122 may determine whether or not to drive the button type actuator 11, based on the magnitude or direction of the induced electromotive force applied to the input detection unit 121. For example, the signal control unit 122 may measure, based on the magnitude of the voltage of the induced electromotive force, a degree to which the button part 112 is pressed by the user.

For example, when the magnitude of the voltage of the induced electromotive force formed if the button part 112 is pressed is equal to or larger than a "first set voltage" magnitude, the signal control unit 122 may transmit, to the haptic drive unit 123, the "input signal" for driving the button type actuator 11.

For example, the signal control unit 122 may generate a different input signal for each stage of the magnitude of the voltage of the induced electromotive force. Accordingly, the button type actuator 11 may form a different haptic feedback effect for each stage of the intensity by which the user presses the button part 112.

For example, when it is determined that the magnitude of the voltage of the induced electromotive force is larger than the first set voltage magnitude and is smaller than a "second set voltage magnitude," the signal control unit 122 may determine that the button part 112 is lightly contacted, and may thus transmit a "contact signal" to the haptic drive unit 123.

On the other hand, when it is determined that the magnitude of the voltage of the induced electromotive force is equal to or larger than the first set voltage magnitude and the second set voltage magnitude, the signal control unit 122 may determine that the button part 112 is pressed and may thus transmit the input signal to the haptic drive unit 123.

In other words, the signal control unit 122 may transmit, to the haptic drive unit 123, any one of a plurality of signals distinguished from each other as the "contact signal," the "input signal," or the like according to the magnitude of the voltage of the induced electromotive force.

For example, when it is determined that the magnitude of the voltage of the induced electromotive force is smaller than the first set voltage magnitude, the signal control unit 122 may maintain the haptic drive unit 123 in a sleep mode, thereby also reducing power loss.

For example, the signal control unit 122 may include an amplifier for amplifying the voltage of the induced electromotive force applied from the input detection unit 121 and/or a noise filter for attenuating noise components of the signals.

The haptic drive unit 123 may apply the current to the coil 116 to drive the button type actuator 11.

For example, the haptic drive unit 123 may apply a contact feedback signal to the coil 116 when receiving the contact signal, and may apply an input feedback signal to the coil 116 when receiving the input signal.

Here, the "contact feedback signal" and the "input feedback signal" may be signals having the waveform of the voltage applied to the coil 116 by the haptic drive unit 123. For example, the contact feedback signal and the input feedback signal may move the vibrator with respect to the case, thereby providing the haptic feedback effect. The contact feedback signal and the input feedback signal may vibrate the vibrator with respect to the case at a high frequency, thereby forming an audible sound. The contact feedback signal and the input feedback signal may form different haptic feedback effects. Meanwhile, in contrast, it is noted that the "contact feedback signal" and the "input feedback signal" may be identical to each other.

As another example, the contact feedback signal or the input feedback signal may cause the user to recognize the audible sound by driving a separately provided sound output device (not illustrated) such as a buzzer.

The haptic drive unit 123 may form various haptic feedback effects by adjusting, based on the magnitude and/or the duration time of the induced electromotive force received from the signal control unit 122, frequency characteristics of the waveform of the voltage applied to the coil 116.

Specifically, movement pattern characteristics of the vibrator 114, such as the type of a movement pattern, a movement time, and a movement intensity, may be set, and the input feedback signal or the contact feedback signal corresponding thereto may be applied to the button type actuator 11.

For example, the haptic drive unit 123 may set the type of the movement pattern, based on the magnitude and/or the duration time of the induced electromotive force formed when the button part 112 is pressed. For example, the haptic drive unit 123 may determine a movement duration time of the movement pattern based on the duration time of the induced electromotive force formed when the button part 112 is pressed. For example, the haptic drive unit 123 may determine the movement intensity of the movement pattern based on the magnitude of the induced electromotive force formed when the button part 112 is pressed.

According to the button type actuator feedback system 1 according to the embodiment, a pressure applied to the button part 112 of the button type actuator 11 by the user may function as the input signal of the haptic drive unit 123 for controlling driving of the button type actuator 11. Further, the movement intensity of the button type actuator 11 may be actively adjusted according to the intensity of the pressure applied to the button part 112.

According to the button type actuator feedback system 1 according to the embodiment, characteristics such as the size, the type, the duration time, and/or the occurrence time point of the haptic feedback may be variously set according to an intensity, a time, or a time point at which the user presses the button part 112, and response characteristics of such haptic feedback may be freely set according to the purpose for which the button type actuator 11 is used.

Figure 4:
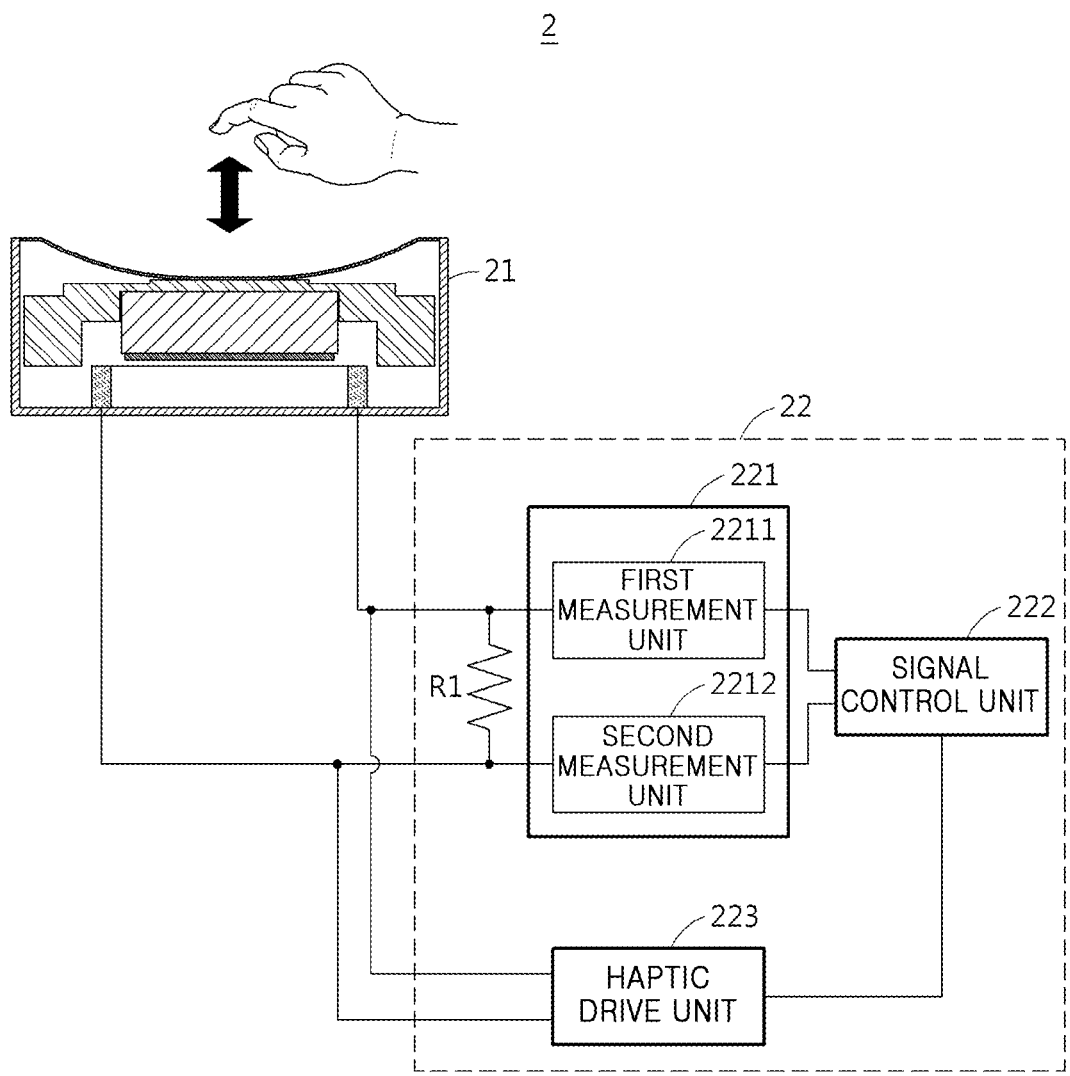
FIG. 4 is a view illustrating the button type actuator feedback system according to the embodiment.

FIG. 4 is a view illustrating the button type actuator feedback system according to the embodiment.

Referring to FIG. 4, a button type actuator feedback system 2 according to an embodiment may include an input detection unit 221 different from the input detection unit 121 of the button type actuator feedback system 1 illustrated in FIGS. 1 to 3 according to the embodiment.

For example, the button type actuator feedback system 2 may include a button type actuator 21 and a controller 22.

The button type actuator 21 may be an actuator that may simultaneously perform input and output, like the button type actuator 11 illustrated in FIGS. 1 to 3 and including the button part 112 (or the input part 112).

The controller 22 may generate haptic feedback by applying a current to a coil of the button type actuator 21.

For example, the controller 22 may include the input detection unit 221, a signal control unit 222, and a haptic drive unit 223.

The input detection unit 221 may be connected to a circuit connected to both ends of the coil of the button type actuator 21, and may detect an induced electromotive force formed when the button type actuator 21 is pressed. For example, the input detection unit 221 may detect a voltage applied to a resistor element R1 connected between the both ends of the coil. In this way, the input detection unit 221 may generate an input signal or a contact signal, based on a relative potential difference between both ends of the resistor element 11 or a change in the relative potential difference.

For example, when the button part of the button type actuator 21 is pressed by the user and the vibrator thus moves downward with respect to the coil, the induced electromotive force formed in a circuit between the coil and the controller 22 in one direction may be measured.

For example, the input detection unit 221 may include a first measurement unit 2211 and a second measurement unit 2212 connected to each other through wires respectively branched from wires connected to the both ends of the coil of the button type actuator 21. The first measurement unit 2211 and the second measurement unit 2212 have ends connected to the ground (not illustrated) and other ends respectively connected to the both ends of the resistor element R1, and may thus detect an absolute voltage measured between the both ends of the resistor element R1.

For example, when the user presses the button part, one measurement unit among the first measurement unit 2211 and the second measurement unit 2212 may measure the magnitude of the voltage of the induced electromotive force formed in one direction by pressing the button part downwards.

Thereafter, when the button part is released and the vibrator thus moves upward with respect to the con, the other one measurement unit may measure the magnitude of the voltage of the induced electromotive force formed in a direction opposite to the one direction.

The signal control unit 222 may determine, through comparison between the magnitudes of the voltages measured by the input detection unit 221, the direction of the induced electromotive force formed in the button type actuator 21, and accordingly may determine whether or not to drive the button type actuator 21.

For example, the signal control unit 222 may transmit, to the haptic drive unit 223, the input signal for driving the button type actuator 21, based on a difference between the magnitudes of the voltages of the induced electromotive forces measured by the input detection unit 221.

For example, the signal control unit 222 may transmit, to the haptic drive unit 223, the input signal at a time point when the difference between the magnitudes of the voltages of the induced electromotive forces measured by the input detection unit 221 reaches a predetermined value.

For example, the signal control unit 222 may transmit the input signal to the haptic drive unit 223 at a time point when a value of the induced electromotive force measured by the input detection unit 221 is changed from a positive value to a negative value or from a negative value to a positive value.

According to the above structure, the controller 22 may transmit a haptic feedback effect at a time point when the user releases the button part from a state in which the user presses and holds the button part of the button type actuator 21.

Considering that the haptic feedback may not be effectively detected in a situation in which the user is pressing the button type actuator 21, the haptic feedback is provided at a time point when the user's force applied to the button part is released, so that the user may effectively detect the haptic feedback.

The haptic drive unit 223 may set the movement characteristics of the button type actuator 21 according to the input signal applied from the signal control unit 222, and may apply an input feedback signal corresponding thereto to the button type actuator 21, thereby forming the haptic feedback effect.

Figure 5:
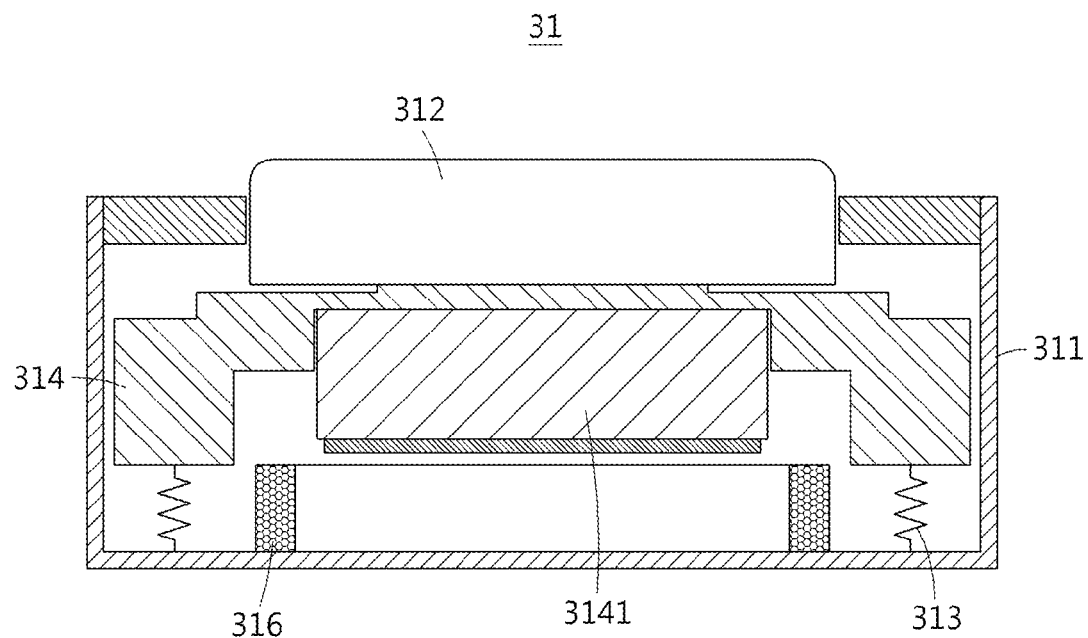
FIG. 5 is a cross-sectional view of the button type actuator according to the embodiment.

FIG. 5 is a cross-sectional view of the button type actuator according to the embodiment.

Referring to FIG. 5, a structure of a button type actuator 31 including a configuration different from that of the button type actuator 21 illustrated in FIG. 2 may be identified.

For example, the button type actuator 31 may include a case 311, a button part 312 (or an input part 312), a vibrator 314, an elastic support 313, and a coil 316.

The case 311 may form an outer shape of the button type actuator 31, and may have the upper surface, at least a portion of which is open.

For example, the button part 312 may be formed of a rigid material, which is unlike the button part 312, and may be installed on the upper surface of the case 311 to be vertically movable. For example, the button part 312 may be connected to the vibrator 314 on the lower side thereof.

For example, the button part 312 and the vibrator 314 may be connected to each other through a separate elastic structure such as an elastic body and a spring. For example, the button part 312 and the vibrator 314 may be formed integrally.

For example, the button part 312 may be pressed by the user in a state of being engaged with a groove formed in the upper surface of the case 311, and may thus be moved downward toward an internal space of the case 311.

For example, since a separate elastic body may be connected between the button part 312 and the case 311, the vertical movement of the button part 312 with respect to the case 311 may be supported.

The elastic support 313 may be an elastic body connected between the internal space of the case 111 and the vibrator 314. The elastic support 313 may support the vertical elastic movement of the button part 312 and the vibrator 314. Meanwhile, although it is illustrated in FIG. 5 that the elastic support 313 vertically supports the vibrator 14 and the case 311, unlike this, a side surface of the vibrator 314 and an inner wall of the case 311 may be connected to each other. The elastic support 313 is sufficient as long as the elastic support 313 is configured to provide an elastic restoring force such that the vibrator 314 returns to a specific position with respect the case 311.

Figure 6:
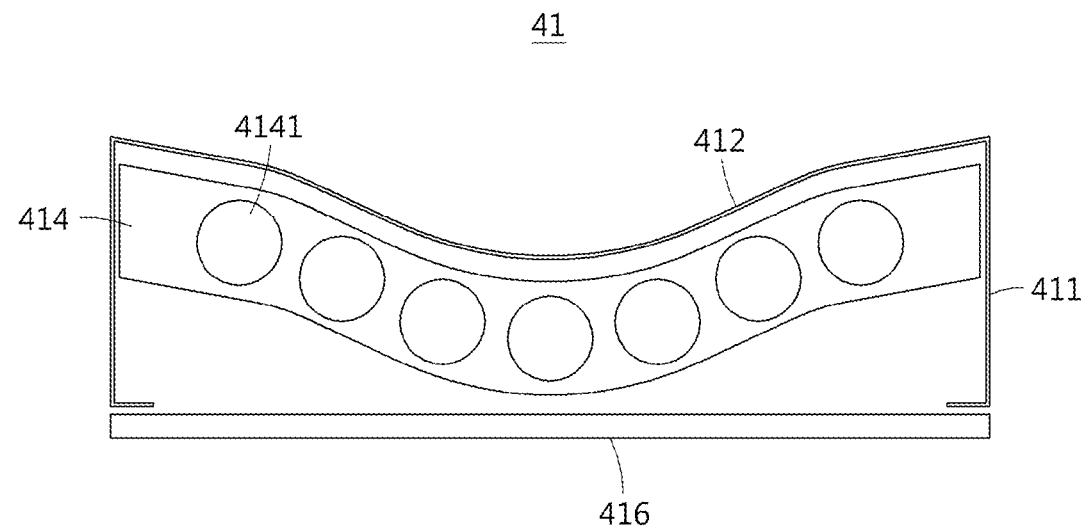
FIG. 6 is a cross-sectional view of the button type actuator according to the embodiment.

FIG. 6 is a cross-sectional view of the button type actuator according to the embodiment.

Referring to FIG. 6, a structure of a button type actuator 41 including a configuration different from those of the button type actuators 11 and 31 illustrated in FIGS. 2 and 5 may be identified.

The button type actuator 41 according to an embodiment may include a case 411, a button part 412 (or an input part 412), a vibrator 414, and a coil 416.

The case 411 may form the outer shape of the button type actuator 41. For example, the case 411 may be formed of a flexible material.

The button part 412 (or the input part 412) may form the upper surface of the case 411 and may be connected to the vibrator 414 on the lower side thereof. For example, the button part 412 may be formed of a flexible material, and may thus be bent downward with respect to the case 411 when pressed by the user. For example, the button part 412 may be formed integrally with the case 411.

The vibrator 414 may be connected to the lower side of the button part 412, and may be moved by a magnetic field formed in the coil 416 installed below the case 411. For example, the vibrator 414 may be formed of a flexible material which may be flexibly bent as the button part 412 is bent.

For example, the vibrator 414 may be formed of a magneto rheological elastomer (MRE) including magnetic particles 4141 that may be magnetized by an external magnetic field.

Figure 7:
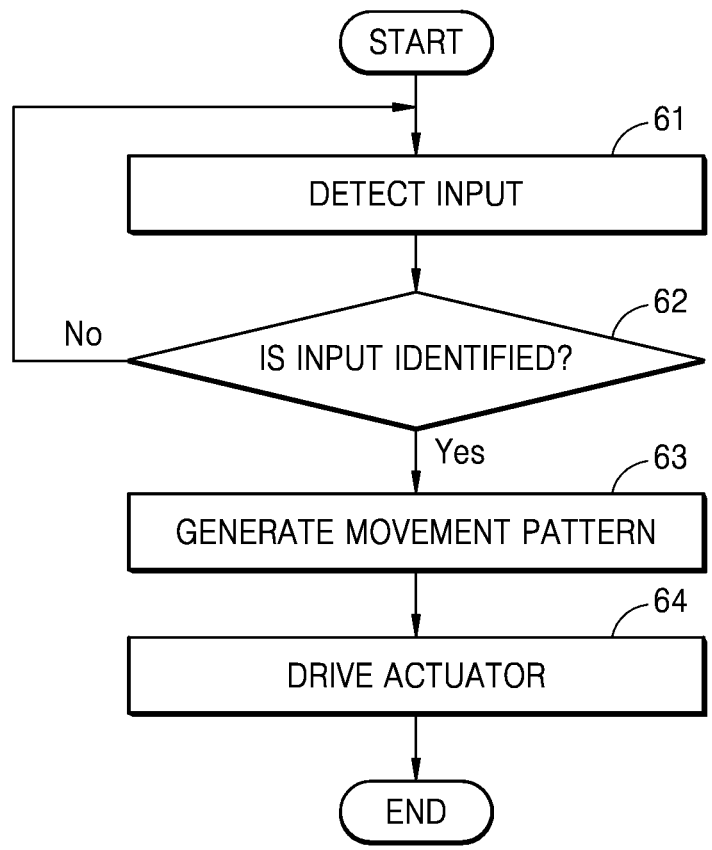
FIG. 7 is a flowchart of a method of controlling the button type actuator feedback system according to the embodiment.
Figure 8:
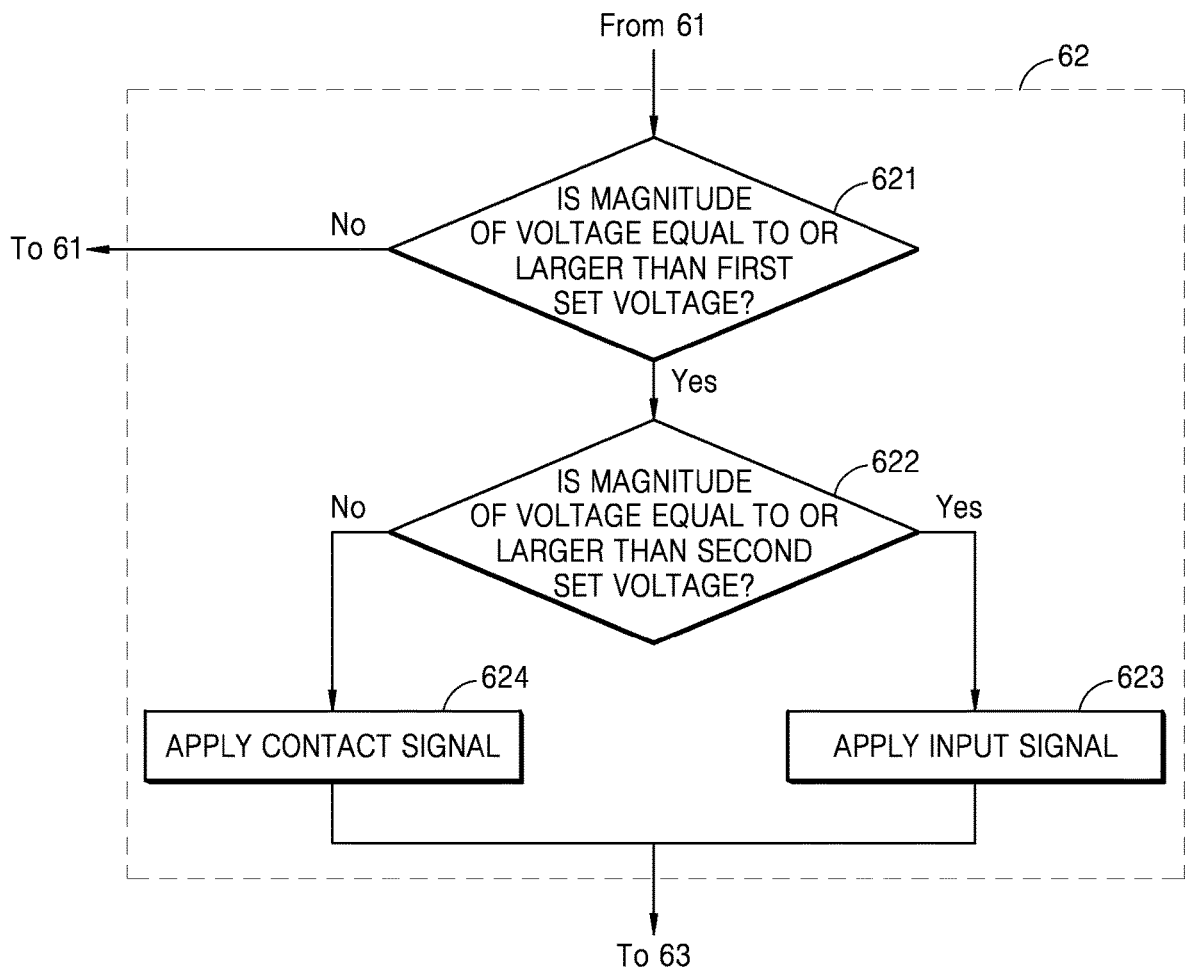
FIG. 8 is a flowchart of an input identification step according to the embodiment.
Figure 9:
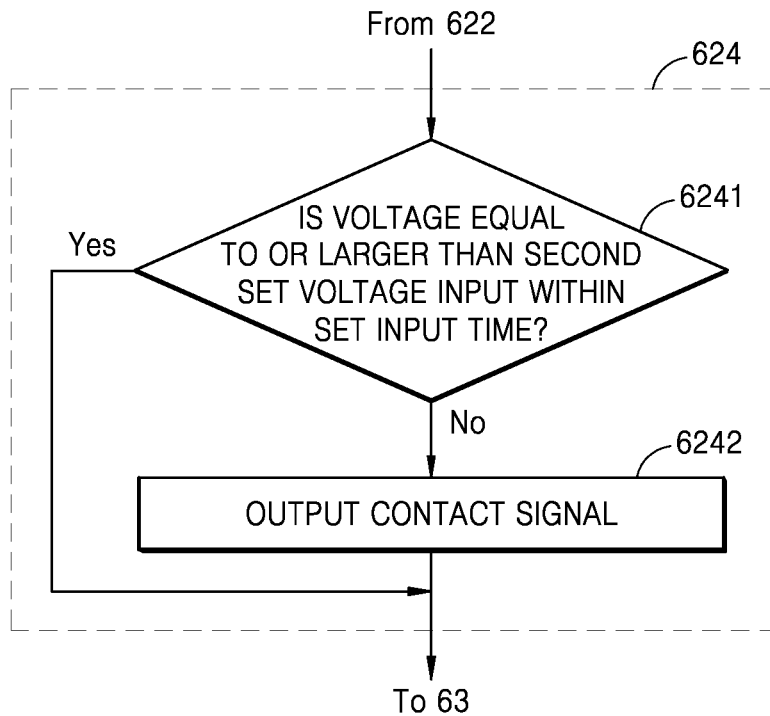
FIG. 9 is a flowchart of a contact signal application step according to the embodiment.
Figure 10:
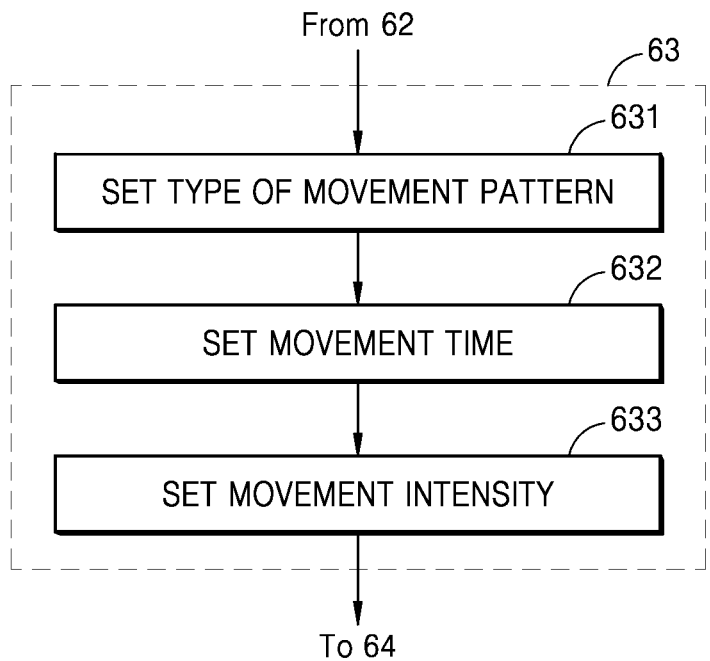
FIG. 10 is a flowchart of a movement pattern generation step according to the embodiment.

FIG. 7 is a flowchart illustrating a method of controlling the button type actuator feedback system according to the embodiment, FIG. 8 is a flowchart illustrating a movement pattern generation step according to the embodiment, FIG. 9 is a flowchart illustrating a contact signal application step according to the embodiment, and FIG. 10 is a flowchart of a movement pattern generation step according to the embodiment.

A method of controlling a button type actuator feedback system according to an embodiment will be described with reference to FIGS. 7 to 10.

For convenience of description, the method of controlling a button type actuator feedback system according to the embodiment will be described with regard to the button type actuator feedback system 1 illustrated in FIGS. 1 to 3. However, it should be noted that configurations of a button type actuator and a button type actuator feedback system used in the method are not limited thereto.

For example, the method of controlling a button type actuator feedback system may include an input detection step 61, an input identification step 62, a movement pattern generation step 63, and an actuator drive step 64.

The input detection step 61 may be a step of detecting, through the controller 12, the induced electromotive force formed when the button part 112 of the button type actuator 11 is pressed by the user.

For example, in the input detection step 61, when the button part 112 is pressed, the input detection unit 121 receives the induced electromotive force formed according to the relative movement of the vibrator 114 and the coil 116. For example, the input detection unit 121 may transmit, to the signal control unit 122, a signal of the magnitude of the voltage or the waveform of the voltage of the formed induced electromotive force.

As another example, in the input detection step 61, without the input identification step 62 and the movement pattern generation step 63 which will be described below, the induced electromotive force formed by the button type actuator 11 may be used as an output power source for driving the button type actuator 11. In this case, the controller 12 may include an amplifier for amplifying the voltage of the induced electromotive force and/or a noise filter for attenuating a noise component of the induced electromotive force.

The input identification step 62 may be a step in which the controller 12 determines, based on the magnitude or direction of the induced electromotive force input in the input detection unit 61, whether or not to drive the button type actuator 11.

For example, in the input identification step 62, when the magnitude of the voltage of the induced electromotive force detected in the input detection step 61 is equal to or larger than the second set voltage magnitude, the signal control unit 122 may transmit, to the haptic drive unit 123, the input signal for driving the button type actuator 11.

For example, at a time point when the button part 112 is pressed and then released in the input detection step 61, in other words, a time point when the direction of a current of the induced electromotive force changes, the signal control unit 122 may generate the input signal to transmit the generated input signal to the haptic drive unit 123.

For example, the signal control unit 122 may determine when and whether the input signal is generated, by measuring and comparing the magnitude of the voltage of the induced electromotive force formed in the one direction when the button part 112 is pressed and the magnitude of the voltage of the induced electromotive force formed in an opposite direction when the button part 112 is released.

For example, the input identification step 62 may include a first set voltage comparison step 621, a second set voltage comparison step 622, a contact signal application step 624, and an input signal application step 623.

The first set voltage comparison step 621 may be a step of determining whether or not the magnitude of the voltage of the induced electromotive force detected by the signal control unit 122 is equal to or larger than a first set voltage.

For example, in the first set voltage comparison step 621, when the magnitude of the induced electromotive force detected by the signal control unit 122 is smaller than the first set voltage, the signal control unit 122 determines that the button part 112 is not intentionally contacted and/or pressed by the user, and may thus not generate the contact signal and the input signal for driving the button type actuator 11. For example, when the magnitude of the induced electromotive force is smaller than the first set voltage, the haptic drive unit 123 is maintained in a sleep state, so that power loss may be reduced.

Meanwhile, the magnitude of the induced electromotive force detected by the signal control unit 122 is equal to or larger than the first set voltage, the signal control unit 122 determines that the button part 112 is contacted by the user, and may thus generate the contact signal or the input signal for driving the button type actuator 11.

The second set voltage comparison step 622 may be a step of determining whether or not the magnitude of the voltage of the induced electromotive force detected by the signal control unit 122 is equal to or larger than a second set voltage.

For example, in the second set voltage comparison step 622, when the magnitude of the induced electromotive force detected by the signal control unit 122 is smaller than the second set voltage, the signal control unit 122 may determine that input according to the pressing on the button part 112 by the user does not occur. In other words, the signal control unit 122 determines that the button part 112 is not pressed and is lightly contacted by the user, and may thus perform the contact signal application step 624.

Meanwhile, when the magnitude of the induced electromotive force detected by the signal control unit 122 is equal to or larger than the second set voltage, the signal control unit 122 determines that the button part 112 is pressed by the user, and may thus perform the input signal application step 623.

The input signal application step 623 may be a step in which when the button part 112 is pressed by the user, the signal control unit 122 generates the input signal to transmit the generated input signal to the haptic drive unit 123.

In the contact signal application step 624, the contact signal may be generated at a time point when the button part 112 is lightly contacted by the user, and may be applied to the haptic drive unit 123. Here, the contact signal may form the contact feedback signal different from the input feedback signal formed by the input signal.

For example, the contact feedback signal may vibrate the button part 112 and the vibrator 114 with respect to the case 111 at a high frequency, thereby forming an audible sound.

As another example, the contact feedback signal may cause the user to recognize the audible sound by driving the separately provided sound output device (not illustrated) such as a buzzer.

According to the contact signal application step 624, when the button part 112 is lightly contacted by the user, a unique haptic feedback effect according to the corresponding contact situation is generated, so that the user may recognize a situation in which the button part 112 of the button type actuator 11 is not pressed and is lightly contacted.

Through this, the user receives the haptic feedback effect according to the contact of the button type actuator 11, and may thus easily search for the position of the button part 112 of the button type actuator 11 even though the user does not directly view the button part 112.

For example, the contact signal application step 624 may include a subsequent input identification step 6241 and a contact signal output step 6242.

The subsequent input identification step 6241 may be a step in which the signal control unit 122 determines whether or not the button part 112 is pressed within a "set input time" from a time point when it is determined that the button part 112 is contacted, and thus determines whether or not to perform the contact signal output step 6242 of outputting the contact signal to the haptic drive unit 123.

For example, when the signal control unit 122 determines that the button part 112 is pressed within the set input time from the time point when it is determined that the button part 112 is contacted, the contact signal output step 6242 may be not performed. For example, like the second set voltage comparison step 622, whether or not the button part 112 is pressed may be determined based on whether or not the magnitude of the induced electromotive force detected by the signal control unit 122 is equal to or larger than the second set voltage.

In contrast, when the signal control unit 122 determines that the button part 112 is not pressed within the set input time from the time point when it is determined that the button part 112 is contacted, the contact signal output step 6242 may be performed.

According to the above structure, when the user presses the button part 112 immediately, that is, within the set input time in a state in which the user contacts the button part 112 and recognizes the position of the button part 112, a situation may be prevented in which the respective haptic feedback effects according to the contact feedback signal and the input feedback signal overlap with each other to cause confusion to the user.

In other words, the controller 12 may detect a situation in which the user presses the button part 112 at once in a state in which the user exactly recognizes the position of the button type actuator 11, and may thus omit the haptic feedback effect according to the contact and generate only the haptic feedback effect according to the input.

The movement pattern generation step 63 may be a step of setting, based on the formation time point, the magnitude, and/or the duration time of the induced electromotive force, the movement pattern characteristics such as the type of the movement pattern, the movement time, and the movement intensity of the button type actuator 11. For example, the movement pattern generation step 63 may be performed at a time point when the input signal or the contact signal is applied to the haptic drive unit 123.

For example, the movement pattern generation step 63 may include a movement pattern type setting step 631, a movement time setting step 632, and a movement intensity setting step 633.

The movement pattern type setting step 631 may be a step of setting the types of movement patterns of the vibrator 114 and the button part 112 of the button type actuator 11.

For example, the haptic drive unit 123 may variously set the type of the movement pattern by adjusting, based on characteristics of the induced electromotive force formed from the button type actuator 11, frequency characteristics such as the waveform, the amplitude, the period, and/or the phase of the voltage applied to the coil 116.

For example, the haptic drive unit 123 may differently set the movement pattern according to the type of the input signal or the contact signal applied from the signal control unit 122.

The movement time setting step 632 may be a step of setting a movement time of the vibrator 114, based on the duration time or the magnitude of the voltage of the induced electromotive force formed when the button part 112 is pressed.

For example, the haptic drive unit 123 may differently set the movement time of the movement pattern according to the type of the input signal or the contact signal applied from the signal control unit 122.

The movement intensity setting step 633 may be a step in which the haptic drive unit 123 sets the movement intensity of the vibrator 114, based on the magnitude of the voltage of the induced electromotive force formed when the button part 112 is pressed.

For example, the haptic drive unit 123 may differently set a movement size of the movement pattern according to the type of the input signal or the contact signal applied from the signal control unit 122.

The actuator drive step 64 may be a step of moving the vibrator 114, based on the induced electromotive force formed when the button part 112 is pressed.

For example, in the actuator drive step 64, the haptic drive unit 123 may transmit the haptic feedback effect to the user contacting the button part 112 by applying, to the coil 116, a voltage waveform signal corresponding to the set type of the movement pattern, the set movement time, and/or the set movement size.

For example, in the actuator drive step 64, when receiving the contact signal from the signal control unit 122, the haptic drive unit 123 may apply the preset contact feedback signal to the coil 116. On the other hand, when receiving the input signal from the signal control unit 122, the haptic drive unit 123 may apply the preset input feedback signal to the coil 116.

Figure 11:
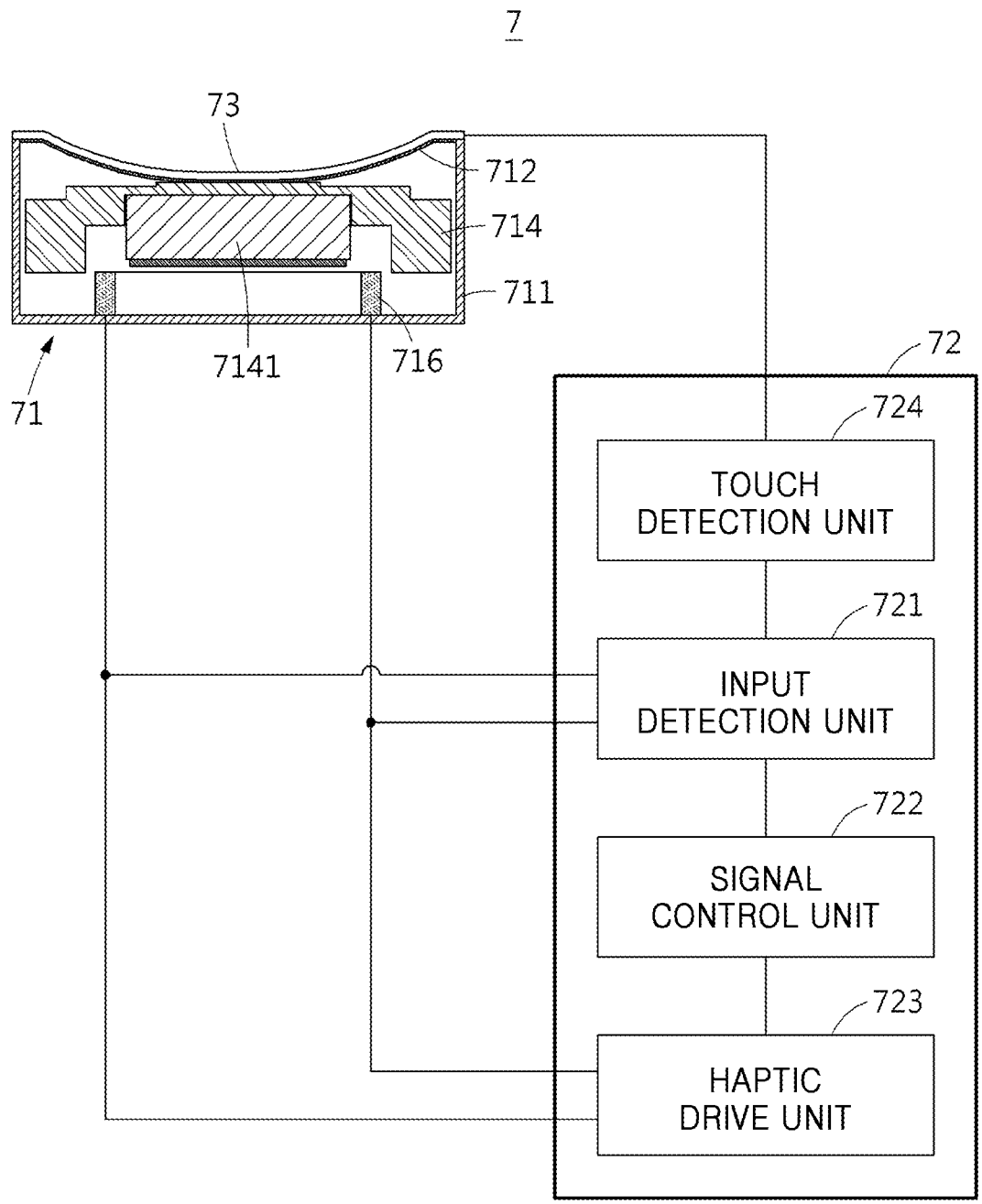
FIG. 11 is a view illustrating the button type actuator feedback system according to the embodiment.

FIG. 11 is a view illustrating the button type actuator feedback system according to the embodiment.

Referring to FIG. 11, a button type actuator feedback system 7 according to an embodiment may include a button type actuator 71, a touch panel 73, and a controller 72.

The button type actuator 71 may include a case 711, a button part 712, a coil 716, and a vibrator 714. Hereinafter, the button type actuator 71 will be described based on the embodiment illustrated in FIG. 2. However, it should be noted that unless otherwise stated, the following description may be also applied to the embodiment illustrated in FIG. 5 or 6.

For example, the button part 712 may be installed to cover at least a portion of the upper surface of the case 711, and at least a portion of the button part 712 may be formed of a flexible material that may be bent vertically with respect to the case 711.

The vibrator 714 may be connected to the lower side of the button part 712 and may be moved vertically with respect to the coil 716.

The touch panel 73 may be formed to cover at least a portion of the upper surface of the button part 712. For example, when the user contacts the touch panel 73, the touch panel 73 may form an electric signal to transmit the formed electric signal to the controller 72.

For example, the touch panel 73 may be a capacitive touch panel using the capacitance of a human body or a pressure-sensitive touch panel. For example, it should be noted that the touch panel 73 may be formed integrally with the button part 712.

When detecting contact of the touch panel 73 connected to the upper side of the button type actuator 71, the controller 72 may apply the contact feedback signal to the button type actuator 71. Further, when detecting the pressing on the button part 712 of the button type actuator 71, the controller 72 may apply the input feedback signal to the button type actuator 71.

For example, the controller 72 may include a touch detection unit 724, an input detection unit 721, a signal control unit 722, and a haptic drive unit 723.

When the user contacts the upper surface of the touch panel 73, the touch detection unit 724 may determine whether or not the contact occurs, by measuring a change in a current according to a change in the capacitance.

The input detection unit 721 may be connected to a circuit connected to both ends of the coil of the button type actuator 71 and may detect the induced electromotive force formed when the button type actuator 71 is pressed.

The signal control unit 722 may determine whether or not to drive the button type actuator 71, based on whether or not the touch panel 73 is contacted and the magnitude or direction of the induced electromotive force applied to the input detection unit 721.

For example, the signal control unit 722 may generate the contact signal at a time point when the upper surface of the touch panel 73 is contacted by the user, and may apply the generated contact signal to the haptic drive unit 723. For example, the signal control unit 722 may generate the input signal at a time point when the magnitude or direction of the induced electromotive force formed when the button part 712 is pressed by the user corresponds to a set input condition, that is, a time point when it is determined that the button part 712 is pressed by the user, and may apply the generated input signal to the haptic drive unit 723.

For example, the signal control unit 722 may not generate the input signal when it is identified that the button part 712 is pressed in a state in which the touch panel 73 is not contacted.

According to the above structure, by detecting a case where the button part 712 is unintentionally pressed by not the user's skin but an external object, unintended malfunction may be prevented.

For example, the signal control unit 722 may determine whether or not the contact signal is generated, by determining whether or not the button part 712 is pressed within the set input time from a time point when the upper surface of the touch panel 73 is contacted by the user.

For example, when the signal control unit 722 determines that the button part 712 is not contacted within the set input time from the time point when it is determined that the button part 712 is contacted, the contact signal may be applied to the haptic drive unit 723. Through this, the haptic drive unit 723 may transmit, to the user, the haptic feedback effect according to the contact by applying the contact feedback signal to the button type actuator 71.

For example, the contact feedback signal may move the button part 712 and the vibrator 714 with respect to the case 711 at a high frequency, thereby forming an audible sound. As another example, the contact feedback signal may cause the user to recognize the audible sound by driving the separately provided sound output device (not illustrated) such as a buzzer.

On the other hand, when it is determined that the button part 712 is pressed within the set input time from the time point when it is determined that the touch panel 73 is contacted, the signal control unit 722 may not form the contact signal, and may form only the input signal according to the pressing on the button part 712 to transmit the formed input signal to the haptic drive unit 723. Accordingly, the haptic drive unit 723 may omit the haptic feedback effect according to the contact, and may apply, to the button type actuator 71, only the haptic feedback effect according to the input on the button part 712.

The haptic drive unit 723 may differently set the movement pattern according to the input signal or the contact signal applied from the signal control unit 722, respectively.

For example, the haptic drive unit 723 may determine, based on the formation time point, the magnitude, and/or the duration time of the induced electromotive force formed from the button type actuator 71, the movement pattern characteristics such as the type of the movement pattern, the movement time, and the movement intensity of the vibrator 714, and may apply, to the coil 716, the contact feedback signal or the haptic feedback signal corresponding to the corresponding movement pattern.

When detecting the contact of the touch panel 73 connected to the upper side of the button type actuator 71, the controller 92 may apply the contact feedback signal to the button type actuator 71. On the other hand, when detecting the pressing on the button part 712 of the button type actuator 71, the controller 72 may apply the input feedback signal to the button type actuator 71.

Figure 12:
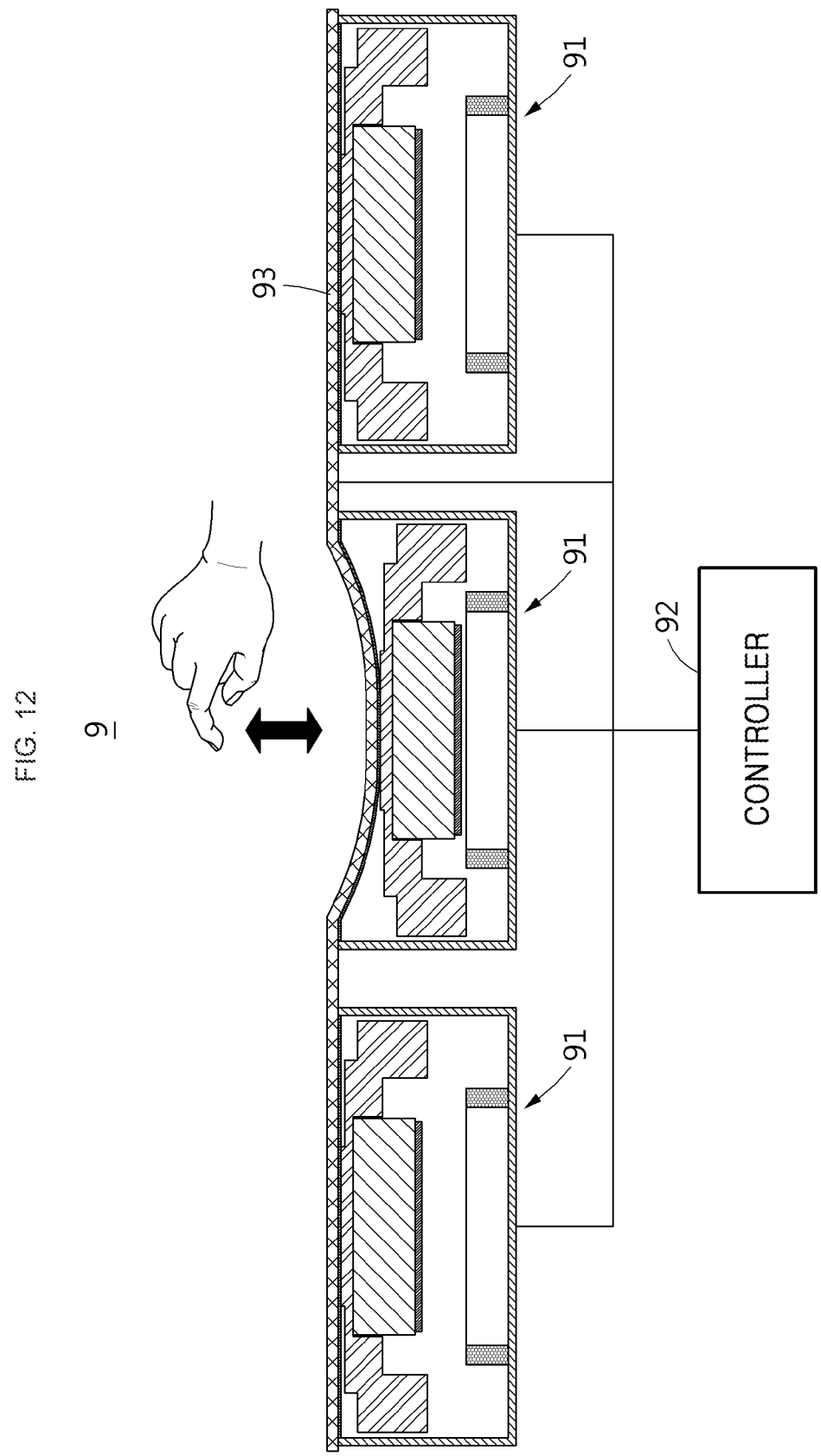
FIG. 12 is a view illustrating the button type actuator feedback system according to the embodiment.

FIG. 12 is a view illustrating the button type actuator feedback system according to the embodiment.

Referring to FIG. 12, a button type actuator feedback system 9 according to an embodiment may include a button type actuator 91, a touch panel 93, and a controller 92.

Similar to the button type actuator illustrated in FIGS. 1 to 11, the button type actuator 91 may be an actuator device that includes a button part and a movement unit that move in an upward direction with respect to a case, and may simultaneously perform the input and the output.

The touch panel 93 may be formed to cover the upper surface of the button part of the button type actuator 91. A plurality of the button type actuators 91 may be installed on the lower surface of one touch panel 93 to be spaced apart from each other.

When detecting contact on a portion of the touch panel 93 connected to the upper side of any one button type actuator 91 among portions of the touch panel 93, the controller 92 may apply the contact feedback signal to the button type actuator 91.

Furthermore, when detecting the pressing on the button type actuator 91, the controller 92 may apply the input feedback signal to the button type actuator 91.

For example, the controller 92 may generate different haptic feedback effects for the plurality of button type actuators 91 by applying different contact feedback signals or different input feedback signals to the plurality of button type actuators 91 respectively.

For example, when it is determined that a portion of the touch panel 93 connected to the upper side of another button type actuator 91 adjacent to any one button type actuator 91 is contacted within a "set contact time" from a time point when the contact on the portion of the touch panel 93 connected to the upper side of the any one button type actuator 91 among the portions of the touch panel 93 is detected, the controller 92 may not apply the contact feedback signal to the button type actuator 91 located at the firstly contacted portion of the touch panel 93.

According to the above structure, when quickly contacting or sweeping various portions of the touch panel 93 in order to search for the position of the button type actuator 91 that the user wants to input, the contact feedback signal is not applied to the button type actuator 91 at the portions of the touch panel 93 quickly contacted or swept in an initial process or an intermediate process, so that a situation may be prevented in which the haptic feedback effects of the plurality of button type actuators 91 according to the contact overlap with each other, and thus confusion to the user is caused.

Figure 13:
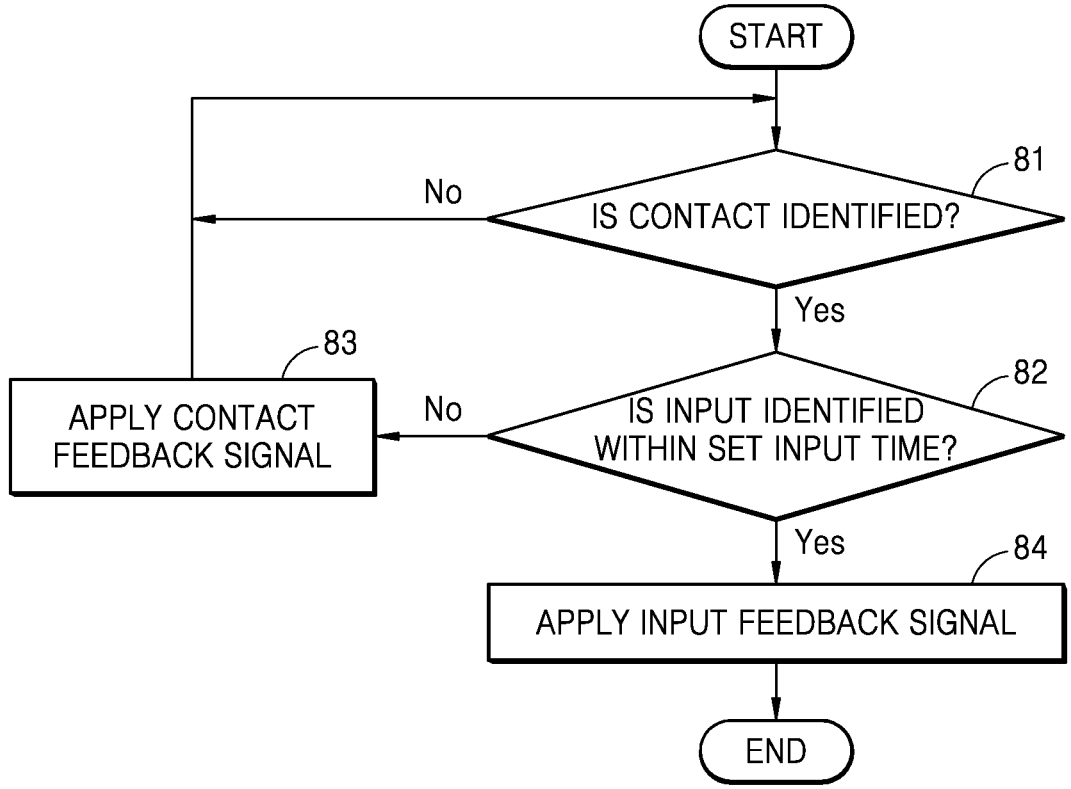
FIG. 13 is a flowchart of a method of controlling the button type actuator feedback system according to the embodiment.
Figure 14:
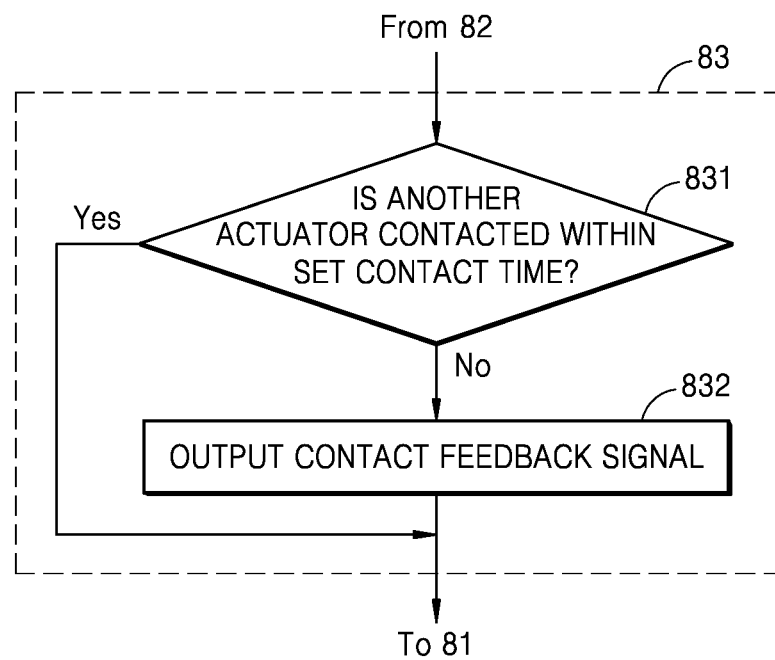
FIG. 14 is a flowchart illustrating a contact feedback signal application step according to the embodiment.

FIG. 13 is a flowchart illustrating a method of controlling the button type actuator feedback system according to the embodiment, and FIG. 14 is a flowchart illustrating a contact feedback signal application step according to the embodiment.

With reference to FIGS. 13 and 14, a control method of generating the haptic feedback effect based on the input of the user through the button type actuator feedback systems 7 and 9 according to the embodiment illustrated in FIGS. 11 and 12 will be described.

For example, a method of controlling a button type actuator feedback system may include a contact identification step 81, an input identification step 82, a contact feedback signal application step 83, and an input feedback signal application step 84.

The contact identification step 81 may be a step of identifying whether or not the touch panel 93 attached to the upper surface of the button part of the button type actuator 91 is contacted by the user.

For example, when a plurality of the button type actuators 91 are provided in the touch panel 93, the controller 92 may determine, based on the position of a portion of the touch panel 93 contacted by the user, that the button type actuator 91 located below the contacted portion of the touch panel 93 among the plurality of button type actuators 91 is contacted.

For example, in the contact identification step 81, when the controller 92 detects the contact of the user on the touch panel 93, the input identification step 92 may be performed.

As another example, in the contact identification step 81, when the controller 92 detects the contact of the user on the touch panel 93, the contact feedback signal application step 83 may be performed regardless of whether or not the input identification step 82 is performed.

The input identification step 82 may be a step of identifying whether or not the button type actuator 91 is pressed and held by the user.

For example, when the magnitude or direction of the induced electromotive force formed when the button part of the button type actuator 91 is pressed by the user corresponds to the set input condition, the controller 92 may determine that the button type actuator 91 is pressed.

For example, in the input identification step 82, when the controller 92 determines that the button part of the button type actuator 91 is pressed by the user, the input feedback signal application step 84 may be performed.

For example, when it is determined in the input identification step 82 that the button part of the button type actuator 91 connected to a lower side of the portion of the touch panel 93 of which the contact is detected is pressed within the set input time a time point when it is detected in the contact identification step 81 that the touch panel 93 is contacted, the controller 92 may perform the input feedback signal application step 84 without performing the contact feedback signal application step 83.

Unlike the above, when it is determined that the button part of the button type actuator 91 is not pressed within the set input time, the controller 92 may perform the contact feedback signal application step 83.

The input feedback signal application step 84 may be a step in which the controller 92 applies the contact feedback signal to the button type actuator 91 of which the input is detected. For example, in the input feedback signal application step 84, the controller 92 may apply different input feedback signals to the plurality of button type actuators 91, respectively.

The contact feedback signal application step 83 may be a step in which the controller 92 applies the contact feedback signal to the button type actuator 91 located below the portion of the touch panel 93 of which the contact is detected. For example, in the contact feedback signal application step 83, the controller 92 may apply different contact feedback signals to the plurality of button type actuators 91, respectively.

For example, the contact feedback signal application step 83 may include a subsequent contact identification step 831 and a contact feedback signal output step 832.

The subsequent contact identification step 831 may be a step of determining whether or not a portion of the touch panel 93 connected to the upper side of another button type actuator 91 adjacent to any one button type actuator 91 is contacted within the set input time from a time point when it is detected that a portion of the touch panel 93 connected to the upper side of the any one button type actuator 91 among portions of the touch panel 93 is contacted.

For example, when it is determined in the subsequent contact identification step 831 that the another button type actuator 91 adjacent to the any one button type actuator 91 is contacted within a set contact time from a time point when it is determined that the any one button type actuator 91 is contacted, the controller 92 may not perform the contact feedback signal output step 832 for applying the contact feedback signal of the firstly contacted button type actuator 91.

Unlike this, when it is determined that the contact of the another button type actuator 91 adjacent to the any one button type actuator 91 is not detected within the set contact time from the time point when it is determined that the any one button type actuator 91 is contacted, the controller 92 may perform the contact feedback signal output step 832.

The contact feedback signal output step 832 may be a step of outputting the contact feedback signal to the button type actuator 91 of which the contact is detected. The contact feedback signal may transmit the haptic feedback effect by moving a vibrator of the button type actuator 91 of which the contact is detected. The contact feedback signal may vibrate the vibrator at a high frequency, thereby forming the audible sound. The contact feedback signal may cause the user to recognize the audible sound by driving the separately provided sound output device (not illustrated). Here, The "audible sound" may be understood as a concept including not only a simple notification sound but also a guide message for guiding a function performed by the button type actuator 91 of which the contact is detected. For example, the contact feedback signal may be set differently for each of the plurality of button type actuators 91 so as to identify of which the button type actuator 91 the contact is detected.

As described above, although the embodiments have been described with reference to the limited drawings, various modifications and changes may be made based on the above description by those skilled in the art. For example, even though the described technologies are performed in an order different from the described method, and/or the described components such as a structure and a device are coupled or combined in a form different from the described method or are replaced or substituted by other components or equivalents, appropriate results may be achieved.

The invention claimed is:

1. An actuator feedback system comprising:
   a case;
   a button part of which at least a portion moves with respect to the case;
   a vibrator connected to the button part and comprising a magnetic body;
   a coil configured to generate a magnetic field in the vibrator; and
   a controller configured to apply, based on a magnitude or a direction of an induced electromotive force generated in the coil as the button part is manipulated by a user, a current to the coil to move the vibrator,
   wherein the controller comprises:
   an input detection unit configured to detect the induced electromotive force generated in the coil when the button part is manipulated; and
   a signal control unit configured to determine, based on information on the induced electromotive force detected by the input detection unit, a time point when the vibrator starts to be moved.

2. The actuator feedback system of claim 1, wherein the button part is in an elastic plate-type membrane valve shape and is installed to cover at least a portion of an upper surface of the case.

3. The actuator feedback system of claim 1, wherein the vibrator is attached to a lower surface of the button part and is made of a bendable flexible material, and the magnetic body includes magnetic particles uniformly contained in the vibrator.

4. The actuator feedback system of claim 1, wherein the controller is configured to apply the current to the coil in a plurality of modes to move the vibrator, based on a depth at which the button part is pressed.

5. The actuator feedback system of claim 1, wherein the controller is configured to produce an audible sound, based on the magnitude or the direction of the induced electromotive force generated in the coil.

6. The actuator feedback system of claim 1, wherein the controller moves the vibrator when the magnitude of the induced electromotive force generated when the button part is pressed is equal to or larger than a set voltage magnitude.

7. The actuator feedback system of claim 1, wherein the controller moves the vibrator when the direction of the induced electromotive force is changed as the button part starts to be released from a state in which the button part is pressed.

8. The actuator feedback system of claim 1, wherein the signal control unit moves the vibrator at a time point when a voltage value of the induced electromotive force changes from a positive value to a negative value or at a time point when the voltage value of the induced electromotive force changes from the negative value to the positive value.

9. A method of controlling an actuator feedback system, the actuator feedback system comprising an actuator,
   wherein the actuator comprises: a case; button part of which at least a portion moves with respect to the case by being manipulated by a user; a vibrator connected to the button part and comprising a magnetic body; and a coil configured to generate a magnetic field in the vibrator,
   the method comprising:
   an input detection step, for detecting an induced electromotive force generated in the coil when the button part is manipulated;
   a determining step, for determining a time to move the vibrator based on a magnitude or a direction of the induced electromotive force; and
   a drive step, for moving the vibrator.

10. The method of claim 9, wherein
    in the drive step, moving the vibrator by applying a current to the coil in a plurality of modes, based on a depth at which the button part is pressed.

11. The method of claim 9, wherein
    in the input detection step, generating an input feedback signal when a voltage magnitude of the detected induced electromotive force is equal to or larger than a set voltage magnitude.

12. The method of claim 9, wherein
    the drive step is carried out at a time point when the direction of the induced electromotive force is changed.

13. The method of claim 9, further comprising:
    a movement pattern generation step, for generating information on a movement pattern of the vibrator based on a formation time point, the magnitude, or a duration time of the induced electromotive force.

14. The method of claim 13, wherein
    the movement pattern generation step comprises:
    a movement pattern setting step, for setting a type of the movement pattern based on the magnitude or the duration time of the induced electromotive force generated when the button part is manipulated.

15. The method of claim 14, wherein
the movement pattern generation step further comprises:
a movement time setting step, for determining a movement time of the vibrator based on the duration time or a voltage magnitude of the induced electromotive force generated when the button part is manipulated; and
a movement intensity setting step, for determining a movement intensity of the vibrator based on the voltage magnitude of the induced electromotive force generated when the button part is manipulated.

16. The method of claim 9, wherein
the drive step is carried out by applying a different input signal to the coil for each stage of the voltage magnitude of the induced electromotive force measured in the input detection step.

17. The method of claim 9, further comprising:
a sound production step, for producing an audible sound based on the magnitude or the direction of the induced electromotive force.

18. A method of controlling an actuator feedback system, the actuator feedback system comprising an actuator,
wherein the actuator comprises: a case; a button part of which at least a portion moves with respect to the case by being manipulated by a user; a vibrator connected to the button part and comprising a magnetic body; and a coil configured to generate a magnetic field in the vibrator,
the method comprising:
an input detection step, for detecting an induced electromotive force generated in the coil when the button part is manipulated; and
a drive step, for moving the vibrator based on a magnitude or a direction of the induced electromotive force,
wherein
if a voltage magnitude of the induced electromotive force is larger than a first set voltage magnitude and smaller than a second set voltage magnitude, the drive step is carried out by determining that the button part is contacted by the user and applying a contact feedback signal to the actuator, and
if it is determined that the voltage magnitude of the induced electromotive force is equal to or larger than the first set voltage magnitude and the second set voltage magnitude, the drive step is carried out by determining that the button part is pressed by the user and applying an input feedback signal to the actuator.

19. The method of claim 18, wherein
in the drive step,
(i) if it is determined that the button part is pressed within a set input time from a time point when the button part is contacted, the contact feedback signal is not output, and
(ii) if it is determined that the button part is not pressed within the set input time from the time point when the button part is contacted, the contact feedback signal is output.

* * * * *